Aug. 31, 1965 W. H. RIGHTER 3,203,745

CARD RETAINER

Filed March 10, 1964

INVENTOR.
WALTER H. RIGHTER

BY Moody and Phillion

ATTORNEYS

United States Patent Office 3,203,745

Patented Aug. 31, 1965

3,203,745
CARD RETAINER

Walter H. Righter, Orange, Calif., assignor to Collins Radio Company, Cedar Rapids, Iowa, a corporation of Iowa Filed Mar. 10, 1964, Ser. No. 350,826
4 Claims. (Cl. 312—183)

This invention relates generally to card holders and, more specifically, to card holding means into and from which cards, such as circuit cards, can be inserted and removed quickly, and with ease.

Many card holders have been developed as a result of the extensive use of printed circuit cards. However, most of these card holders incorporate spring clips which contact the lower portion of a printed circuit card or which extend, perhaps, halfway up the width of the card. Such prior art card holders do not extend around the entire card so as to positively clip the card at opposite ends thereof.

An object of the present invention is to provide a card holder which will grip circuit cards positively so there is virtually no possibility of the card slipping out or moving away from the contact terminals.

A second object of the invention is a reliable card holder of simple and inexpensive construction.

A third purpose of the invention is a card holder which grips the card completely around opposite ends thereof.

A fourth aim of the invention is the improvement of card holders, generally.

In accordance with the invention there are provided two rows of card holding members, the said two rows lying in two parallel planes and positioned directly across from each other. Each of said rows comprises a plurality of elongated bifurcated members of a spring material with each bifurcated member having first and second arms substantially parallel to each other. The bifurcated members lie side-by-side in the row with the first arm of one member adjacent to the second arm of the adjacent bifurcated member and parallel thereto, and with all the arms lying in the same plane. The second arm of each member has a lip formed on the free end thereof, which lip extends outwardly from said arm and towards the first arm of the adjacent bifurcated member to act as a spacer between said second arm and said first arm. The said lip is of sufficient magnitude to create a slot between the said second and first arms of sufficient size to hold a circuit card inserted therein.

In accordance with the feature of the invention, the free ends of the arms of the bifurcated members are rounded to permit easy entry of a circuit card past the lip on said second arm and into the slot formed by said second arm of a given bifurcated member and the first arm of the adjacent bifurcated member.

The above and other objects and features of the invention will be more fully understood from the following detailed description thereof when read in conjunction with the drawings in which.

Figure 1:
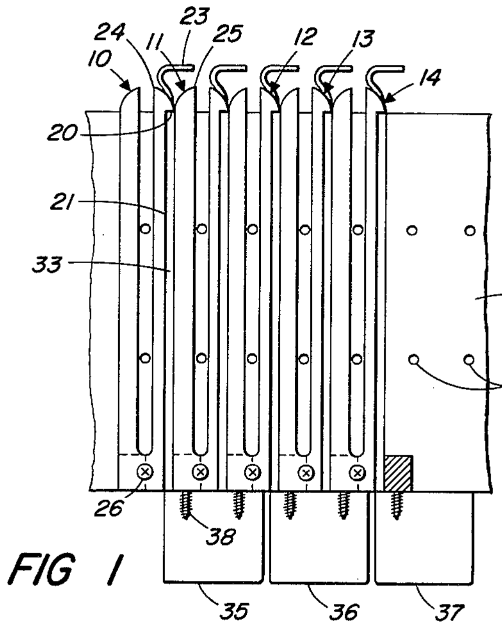
FIG. 1 represents a plan view of a row of the bifurcated members with cards being held therein.
Figure 2:
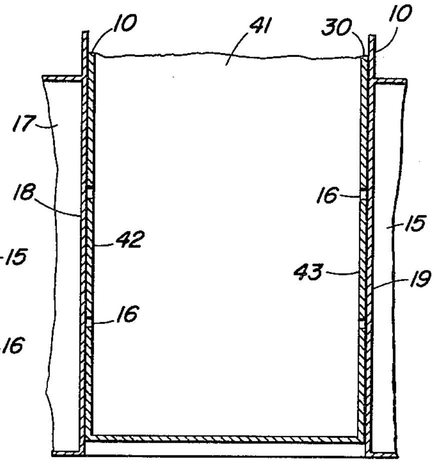
FIG. 2 is a side view of the structure of FIG. 1, and illustrates how the bifurcated members are combined with frames or cages which hold the bifurcated members which, in turn, hold the circuit cards.
Figures 3, 4:
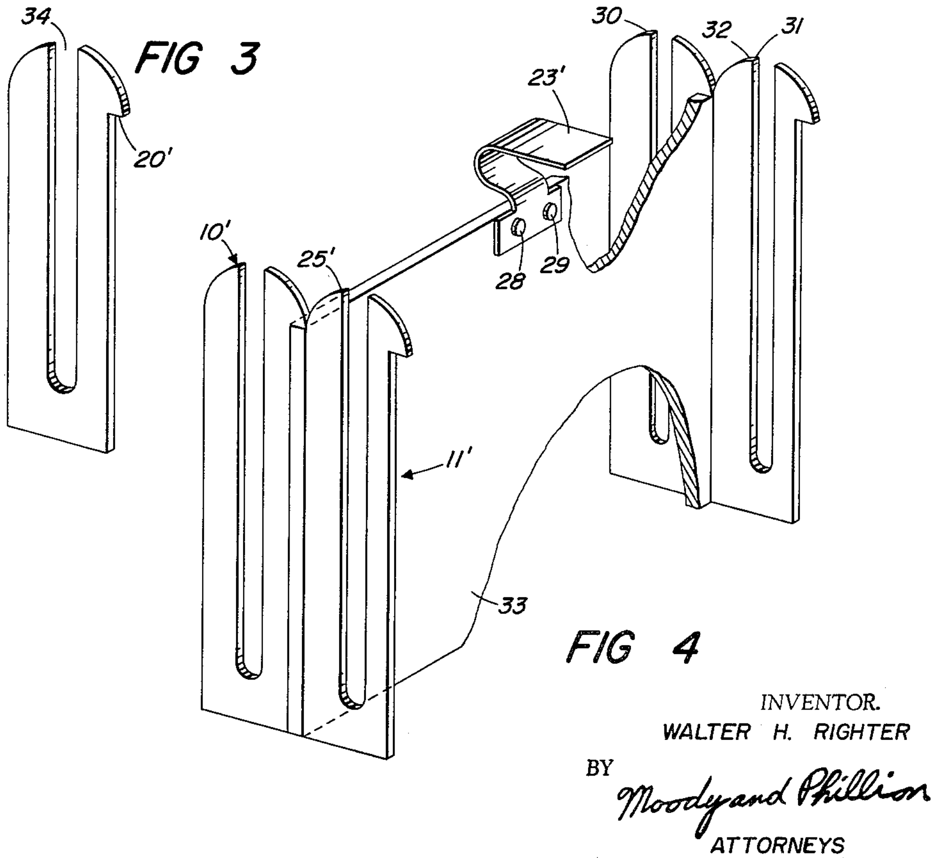
FIG. 3 is a perspective view of one of the bifurcated members.
FIG. 4 is a perspective view of a circuit card being held in position by a pair of bifurcated elements at either end thereof.

Referring now to FIG. 1, there is shown a single row of the bifurcated members 10, 11, 12, 13, and 14, a wall of plenum chamber 15 to which they are attached, and connectors 35, 36, and 37 into which the circuit cards are plugged. It is to be understood that another row of bifurcated members exists to hold the other ends of the cards, which other row is not shown in FIG. 1, but which is indicated in FIG. 2, and is also shown in FIG. 4.

In FIG. 1, the bifurcated members 10, 11, 12, and 13 can be seen to each have two arms with the right-hand arm having a lip thereon. For example, the bifurcated member 10 has a lip 20 on the right-hand arm 24 thereof. Such lip provides spacing between the said right-hand arm and the left-hand arm 25 of the adjacent bifurcated member 11. Such spacing is provided for a card to be inserted therein, as will be discussed later.

These bifurcated members are secured at the bases thereof to the wall of the plenum chamber 15 by suitable means, such as rivets 26, weld spots, or other suitable means.

It should be noted that the plenum chamber 15 functions not only to provide means for holding the cards but also to provide cooling for the circuit cards therein. More specifically, two plenum chambers, each containing a row of cards, are positioned side-by-side with a spacing therebetween. In FIG. 2 the two plenum chambers are denoted by reference characters 15 and 17 with spacing 41 therebetween. Air is forced into the plenum chambers 15 and 17 and blows out the holes 16. The chamber formed by walls 42 and 43 of the plenum chambers 17 and 15, and other necessary walls, provides a means for the air forced into the plenum chambers 17 and 15 to blow out of the system. In FIG. 2, rows of bifurcated members are designated generally by reference characters 18 and 19 and are supported on the walls of plenum chambers 17 and 15, respectively.

Referring again to FIG. 1, it will be observed that the bifurcated members 10 through 13 are positioned side-by-side so that the lip on the right-hand member of each forms a spacer between it and the adjaent bifurcated member, leaving a slot thereinbetween. All of the arms of the bifurcated members are arranged parallel to one another. Thus, a slot 21 is formed between adjacent bifurcated members 10 and 11, into which a circuit board 33 can be inserted through the free rounded ends of the bifurcated members. As a card is inserted into one of the slots provided therefor as, for example, between arms 24 and 25 of bifurcated members 10 and 11, the arms 24 and 25 will spread apart permitting the card to slide into the slot 21 therebetween. Once the card is in the slot, the lip 20 will spring back over the upper edge of the card locking it securely therein. Lip 20 can be slightly shorter than the card thickness to prevent card vibration.

To remove the card, there is provided on each card a handle, such as handle 23 of the card in slot 21. Such handle is secured to the card by suitable fastening means 28 and 29, as shown in FIG. 4. FIG. 4 also shows bifurcated members 10' and 11', corresponding to members 10 and 11 of FIG. 1, as well as the corresponding bifurcated members 30 and 31 in the opposite row, not shown in FIG. 1. By merely pressing the handle 23' to the right, the arm 25 of member 11' and the corresponding arm of member 31 are flexed to the right so that the card 33 can be removed from the slot.

While many specific designs of the bifurcated members are possible, it has been found that a preferred embodiment is the one shown in FIG. 3, wherein the bifurcated member is shown to be essentially a flat elongated member with a slot 34 therein, permitting flexing of either arm thereof independent of the other. The free ends of the arms are rounded to permit easy entry of the circuit card.

Referring again to FIG. 1, the circuit card connectors fit into appropriate connector blocks, such as connector blocks 35, 36, and 37. Said connector blocks are secured by appropriate means, such as screws 38, to the bottom of the plenum chamber 15.

It is to be understood that the form of the invention shown and described herein is but a preferred embodiment thereof and that various changes may be made in specific configuration of the bifurcated members, and the means in which they are employed, without departing from the spirit or the scope of the invention.

I claim:

1. In an enclosure having parallel side walls, means for holding circuit cards comprising:

a plurality of elongated bifurcated members, each bifurcated member comprised of first and second arms substantially parallel to each other and constructed of spring material;

a plurality of said bifurcated members positioned side-by-side in a row with the first arm of one member being in juxtaposition with the second arm of the adjacent member and parallel thereto with all arms lying in a common plane;

the free ends of said first and second arms being convex, said second arm having a lip on the free end thereof extending outwardly from said member and towards the first arm of the adjacent member to substantially make contact with the adjacent first arm;

said outwardly extension being of sufficient magnitude to create a slot between the second arm of each member and the first arm of an adjacent member of a size to hold a card inserted therein;

means for holding one row of said bifurcated members on one of said walls with the arms substantially parallel to each other, a second row of said bifurcated members positioned on the opposite wall with an individual bifurcated member being positioned opposite each bifurcated member of said first row and forming a mirror image thereof.

2. Card holder means comprising two rows of elongated bifurcated members arranged in substantially parallel planes with said bifurcated members being grouped in pairs;

each of said pairs comprising a member in each plane positioned directly across from each other with respect to said parallel planes and being substantially mirrored images of each other;

each of said bifurcated members comprised of first and second arms substantially parallel to each other and constructed of spring material;

the second arm of one member being in juxtaposition with the first arm of the adjacent member and parallel thereto, with all arms in a given row lying along one of said parallel planes;

said second arm having a lip on the free end thereof extending outwardly from said bifurcated member and toward the first arm of the adjacent member to substantially make contact with the adjacent first arm;

said outwardly extension being sufficient to create a slot between the second arm of each member and the first arm of the adjacent member of a size to hold a card inserted therein.

3. Card holder means in accordance with claim 2 in which the free ends of each of said arms of said bifurcated members have rounded ends to permit easy entry of a card.

4. Card holder means in accordance with claim 2 comprising frame means lying in each of said parallel planes and in which each of said bifurcated members is secured at the unbifurcated end thereof to said frame means.

References Cited by the Examiner

UNITED STATES PATENTS

| | | | |
|---|---|---|---|
| 1,046,983 | 12/12 | Coulston | 211—41 X |
| 1,900,053 | 3/33 | Glidden | 211—41 |
| 2,511,730 | 6/50 | McClain | 211—41 |

FRANK B. SHERRY, *Primary Examiner.*

CHANCELLOR E. HARRIS, *Examiner.*